Figure 1:
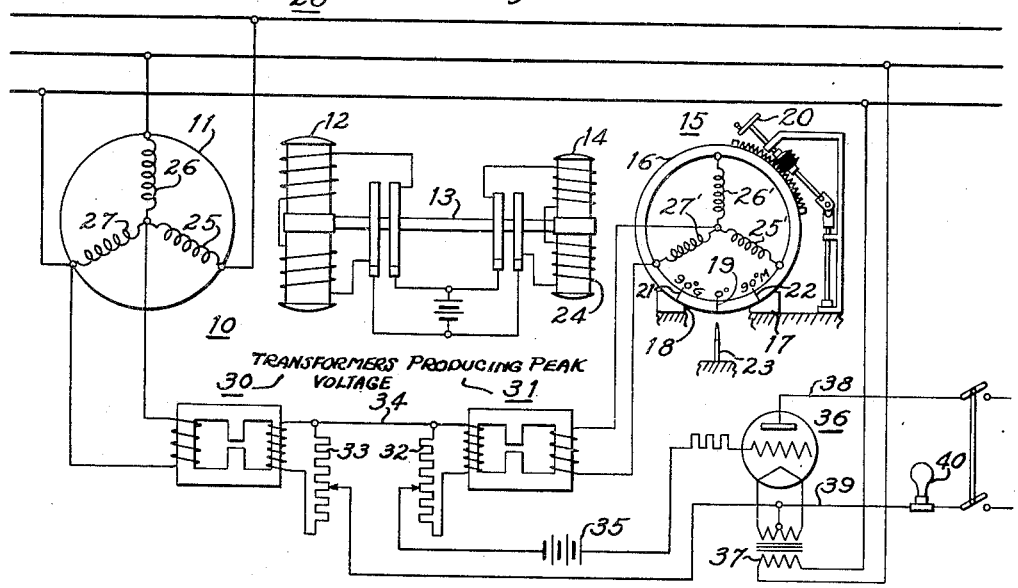

May 7, 1940.    C. C. SHUTT    2,200,103

PHASE INDICATING MEANS

Filed April 21, 1938

WITNESSES:
James F. Young
J. E. Foster

INVENTOR
Charles C. Shutt.
BY
Paul E. Friedemann
ATTORNEY

Patented May 7, 1940

2,200,103

UNITED STATES PATENT OFFICE 2,200,103

PHASE INDICATING MEANS

Charles C. Shutt, Lima, Ohio, assignor to Westinghouse Electric & Manufacturing Company, East Pittsburgh, Pa., a corporation of Pennsylvania Application April 21, 1938, Serial No. 203,307

4 Claims. (Cl. 172—245)

This invention relates to measuring and indicating systems, and particularly to a system for measuring and indicating the angular displacement of the rotor of a synchronous machine under load with reference to its no-load position.

One object of the invention is to provide a simple system including a simple device for measuring the angle of displacement of the rotor of a synchronous machine under load and while it is operating.

Another object of the invention is to provide a system for measuring the angular displacement of the rotor of a synchronous machine under load, and for indicating or utilizing such measurement as a means of control for the system in which the synchronous machine is connected.

When a synchronous motor is operated under load, the rotor becomes slightly retarded or angularly displaced from its normal mechanical phase position, which it would occupy normally under no load conditions when the mechanical in-phase condition would correspond exactly with the electrical in-phase condition.

Under load, however, the rotor tends to be displaced slightly since the magnetic locking connection, which is the magnetic flux between the stator windings and the rotor windings, may be regarded as having a degree of resiliency within the limits which hold the machine locked in step although operating under such load.

In the same way, the rotor of a synchronous generator when operated under load is moved slightly in advance of the normal mechanical phase position it would occupy at no load condition.

In order to measure the angular displacement of the rotor, whether of a motor or of a generator, under load conditions, I provide, for example, a small auxiliary generator device mounted either on the same shaft with the main rotor, or suitably geared to the shaft of the main rotor, in order to derive a checking voltage having the same frequency as that of the synchronous machine.

The voltage derived from the auxiliary generator is supplied to a peaking transformer, from the secondary of which a sharp peak voltage of very short duration may be obtained. A similar peaking transformer is energized from one of the stator windings of the synchronous machine. In each case the maximum voltage derived from the secondary windings of each of the peaking transformers, namely, the tip of its peaks, will have a given phase relation to the point of maximum voltage supplied to the primary windings of the transformer. Each peak voltage may therefore be utilized to indicate the time when the voltage across the primary winding of the transformer is at its 90° point.

By properly combining the two peak voltages, I may procure a control voltage where the two peak voltages are in phase which is sufficient in magnitude and phase position to be utilized to control the potential of the grid element of a three-element electronic tube to render the tube conductive. The tube, when thus made conductive, transmits an operating impulse to energize an indicating device or to operate a control device. Proper operation of the tube is effected by establishing an initial bias which must be overcome by the sum of the two peak voltages. In view of the relatively sharp character of the peak voltages, they must be accurately in phase to establish a control voltage that will be sufficient to overcome the grid bias of the tube.

In order to measure angular displacement of the main rotor it is merely necessary to measure the angular displacement that may be necessary to bring the peak voltage from the auxiliary source into phase with the peak voltage from the main synchronous machine. To permit such measurement to be made while the main rotor is rotating, the auxiliary generator is provided with an adjustable angularly movable stator, suitably mounted in a stationary cradle, to permit the stator to be rotatably adjusted through an angle until the two peak voltages can be synchronized to operate the three element control tube. The amount of angular rotation or adjustment of the auxiliary stator then determines the angular displacement of the rotor of the synchronous machine.

Figure 2:
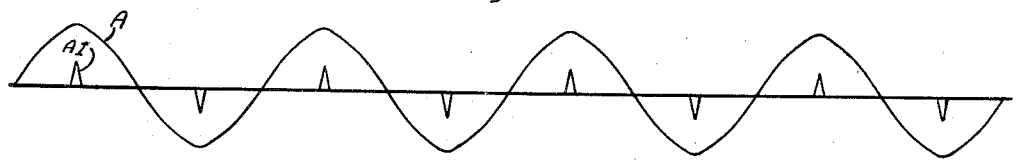
Figure 3:
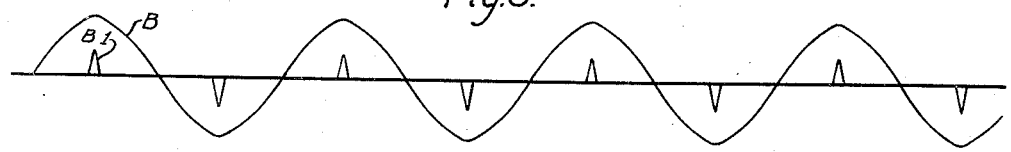
Figure 4:
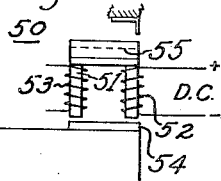
Figure 5:
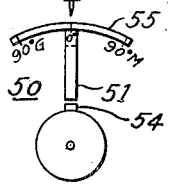
Figure 6:
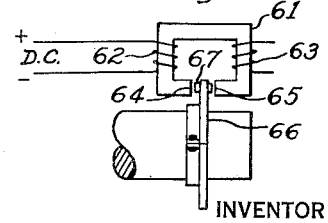

The manner in which the various elements of the system are arranged to operate in accordance with the principle of this invention is illustrated in the accompanying drawing, in which:

Figure 1 is a diagram of the circuit arrangement of the various elements,

Fig. 2 is a graph showing the usual relationship between the peak voltage and the primary voltage of the synchronous machine, Fig. 3 is a graph showing the usual relationship of the primary voltage and of the peak voltage of the auxiliary generator, Fig. 4 is a side view of a modification of an auxiliary generator for establishing peak voltages, Fig. 5 is an end view of the auxiliary generator shown in Fig. 4, and Fig. 6 is a front view of another form of auxiliary generator.

As shown in Fig. 1, a synchronous machine 10, such as a synchronous motor or a synchronous generator, is provided with a stator 11 and a rotor 12. The rotor 12 is mounted upon a shaft 13 which serves also to support a rotor 14 of an auxiliary testing synchronous generator 15 that is also provided with a stator 16. The stator 16 of the auxiliary generator is adjustably supported in two stationary cradle elements 17 and 18. The stator 16 may be rotated by suitable adjusting means to any desired position within a predetermined testing angle that is sufficient for this purpose. The adjusting means may comprise a worm and gear mechanism provided with an operating handwheel 20. The stator frame is suitably marked with an index 19 to indicate a zero or neutral position, and is marked with graduations 21 and 22 to indicate up to 90° generator and up to 90° motor positions, respectively. A stationary finger 23, adjacent the stator, is provided to indicate the normal neutral position of the stator 16. The rotor of the auxiliary generator 15 is provided with suitable field magnet windings 24, and is also provided with the same number of poles as are found on the rotor 12 of the main synchronous machine 10. For simplicity, the auxiliary rotor 14 and the main rotor 12 are shown with two poles. The auxiliary generator should have the same number of poles on both rotor and stator, as the main generator or motor, when the auxiliary generator is direct-connected. More generally, whether the auxiliary generator is direct-connected or not, it must generate a voltage of the same frequency as the main machine.

The auxiliary generator in Fig. 1 is shown with three phase windings, corresponding to those of the main machine, merely for illustrative purposes. The simplest type and, therefore, the preferred type, will be one such as shown in Figs. 4, 5 or 6.

The stator 11 of the main synchronous machine 10 is shown provided with three windings 25, 26 and 27 that are connected to a three-phase circuit 28. The auxiliary generator has corresponding stator windings 25', 26' and 27'.

The primary winding of a peaking transformer 30 is connected across one phase winding, such as phase 27, and the primary winding of a second peaking transformer 31 is connected across a winding 27' of the stator 16 of the auxiliary generator 15 which corresponds to the winding 27. The secondary winding of main peaking transformer 30 is connected to a potentiometer resistor 33, and the secondary winding of auxiliary peaking transformer 31 is connected to a potentiometer resistor 32. The two resistors 32 and 33 are connected through a conductor 34 in such direction as to add the voltages across them. The free terminal of the potentiometer resistor 32 is connected through a biasing battery 35 to the grid element of a three element thermionic tube 36. The free element of the resistor 33 is connected to the cathode of the thermionic tube 36 through a connection including the secondary winding of a heating transformer 37 for the filamentary cathode of the tube. The three element tube is connected to an external circuit through two conductors 38 and 39 to permit a control current to be transmitted by the tube for indicating purposes or for control purposes.

When the stator winding 27 of the main machine 10 is energized, the main peaking transformer 30 will be energized to provide the main peak voltage A1, shown in Fig. 2. The voltage across the primary is indicated by the curve A.

The primary voltage on transformer 31 is indicated by the curve B, and the peak voltage of the secondary of transformer 31 is indicated by the curve B1 in Fig. 3.

The load on the auxiliary generator 15 is constant and relatively small, being only the current required by the transformer 31. With machine 10 unloaded the zero point on the scale 19 on the stator 16 should be set so that it coincides with the pointer 23 when the voltage impulse from the peaking transformer 31 is in time phase with an impulse of like polarity from the secondary of transformer 30. If the main machine, as a motor or as a generator, is to be connected to a large system, such phase check should be made when the machine is substantially unloaded and when the terminals of the main machine are energized and connected to the system. If the main machine is to operate as an isolated generator, such polarity check should be made with the generator excited and unloaded. After the setting is made, and the pointer is at zero, the time phase of the voltage generated in the winding of the auxiliary generator will be proportional to the displacement of the rotor of the main machine from its no-load position. When the main machine is under load, the rotor is mechanically angularly displaced with respect to its normal neutral unloaded position. The voltage curve B will be correspondingly displaced and the peak voltage B1 will also consequently be correspondingly displaced.

While the machine is operating, the peak voltage B1 may be shifted by angularly adjusting the stator 16 to change the phase position of the main voltage B. When the peak voltage B1 is shifted to in phase relation with the peak voltage A1 of the main machine, the two peak voltages A1 and B1 will add to establish a voltage of sufficient value to overcome the biasing voltage 35 on the grid of the tube 36, and the resultant of the peak voltages will thereupon energize the grid sufficiently to render the tube conductive. The tube 36 will thereupon transmit an energy impulse which may be utilized to energize an indicating device as a lamp 40, or to energize a control device to effect any desired external operation.

Instead of the combination of the auxiliary generator of the type shown in Fig. 1 with a peaking transformer, a modified form of peak voltage generator may be employed as shown in Figs. 4, 5 and 6.

In Fig. 4 is illustrated an electromagnetic device 50 comprising a stationary core 51 supporting a primary winding 52 and a secondary winding 53. An armature 54 to complete the magnetic circuit of the core 51, to enable the core to function as a transformer with the two windings 52 and 53, is mounted on the main shaft in any suitable manner to rotate with the shaft. The core is mounted on a support adjacent the shaft so that the armature will move past the core closely enough to complete the magnetic circuit of the core. The primary winding 52 is energized by direct current, and as the armature quickly completes the magnetic circuit of the core once each rotation of the shaft, the secondary winding is energized to induce a sharp peak voltage of short duration. This peak voltage will always be in definite fixed relationship to the shaft. By making the support for the core 51 or for the armature 54 angularly adjustable as in Fig. 5, the core may be moved angularly around the shaft until the peak voltage is synchronized with the peak voltage derived from the synchronous machine winding.

In order to establish optimum initial conditions, the armature bar 54 should be secured on the shaft in line with the center line of a rotor pole on the shaft. Fig. 5 shows an end view of the impulse generator and illustrates the arcuate support 55 for angularly adjusting the core 51 so that the peak voltage induced therein may be shifted to synchronize with that derived from the synchronous machine. By making the angular span of the bar mounted on the shaft short enough, the voltage wave may be made sharp enough to eliminate transformer 30.

In Fig. 6 is shown a further modification of an auxiliary voltage generator. The core 61 supports primary winding 62 and secondary winding 63, and is itself provided with pole tips 64 and 65. A disc 66 is mounted on the shaft and disposed to pass between the pole tips 64 and 65. One or more steel pins 67 are mounted on the disc to substantially close the magnetic circuit between the pole tips 64 and 65. When more than one pin is used, the pins should be equally spaced and should be equal to half the number of poles in the main machine so the auxiliary peak impulses can be synchronized with the main peak impulses of one selected polarity.

My invention is not limited to the specific arrangement, or to the details shown since they may be modified without departing from the spirit and scope of the invention as set forth in the appended claims.

I claim as my invention:

1. A testing system for measuring the angular displacement of the rotor of a synchronous machine under load, comprising means connected to a winding of the stator to establish a voltage wave of sharp peak form and short duration, means driven by the rotor shaft to establish an auxiliary voltage wave of sharp peak form and short duration similar to the other voltage wave, a circuit for both voltage waves, manually operable means for varying the phase relationship between the two voltages, means for detecting synchronism between them, and means for measuring the angle necessary to establish synchronism.

2. A testing system for measuring the angular displacement of the rotor of a synchronous machine under load, comprising transformer means connected to and energized from a winding of the stator of the synchronous machine and designed to produce a voltage of peak wave form and of short effective duration, an auxiliary generator rotor driven by the main rotor, a rotatably adjustable stator for the auxiliary generator, transformer means connected to and energized from the auxiliary generator and designed to produce a voltage of the same frequency as the main voltage and having a peak wave form of short effective duration, means combining the two voltages in an electric circuit to detect synchronism between the two voltages, and means associated with the adjustable stator of the auxiliary generator for indicating the amount of angular movement of the stator necessary to place the peak voltages in phase, thereby to indicate the angular displacement of the main rotor shaft under load conditions.

3. A system for measuring the angular displacement of the rotor of a synchronous machine, comprising means for deriving a substantially peaked test voltage in synchronism with the voltage on a stationary winding of the machine, means for simultaneously generating a second substantially peaked voltage which varies in accordance with the mechanical displacement of the shaft, and means for measuring the electrical angle between the two voltages.

4. A system for measuring the angle of displacement of a rotor of a synchronous machine having a stator winding and a shaft for the rotor, comprising a transformer connected to the stator winding, a transformer controlled by the shaft, phase control means for the shaft controlled transformer, means for indicating synchronism as established by the phase control means between the two voltages derived from the transformers, and means associated with the phase-control means for indicating the electrical angle of adjustment necessary to bring the two voltages into phase.

CHAS. C. SHUTT.